United States Patent
Binder et al.

(10) Patent No.: US 8,014,823 B2
(45) Date of Patent: Sep. 6, 2011

(54) COMMUNICATIONS SYSTEM, INTERMEDIATE ELEMENT FOR A COMMUNICATIONS SYSTEM, AND METHOD FOR ESTABLISHING A COMMUNICATIONS LINK

(75) Inventors: Andreas Binder, Aschheim (DE); Robert Spadinger, Belo Horizonte/MG (BR)

(73) Assignee: Vodafone Holding GmbH, Deusseldorf (DE)

( * ) Notice: Subject to any disclaimer, the term of this patent is extended or adjusted under 35 U.S.C. 154(b) by 573 days.

(21) Appl. No.: 11/794,628

(22) PCT Filed: Dec. 27, 2005
(Under 37 CFR 1.47)

(86) PCT No.: PCT/DE2005/002324
§ 371 (c)(1),
(2), (4) Date: Jun. 29, 2007

(87) PCT Pub. No.: WO2006/069565
PCT Pub. Date: Jul. 6, 2006

(65) Prior Publication Data
US 2010/0048245 A1    Feb. 25, 2010

(30) Foreign Application Priority Data
Dec. 30, 2004   (DE) .......................... 10 2004 063 585

(51) Int. Cl.
*H04B 1/38* (2006.01)

(52) U.S. Cl. ...................................... 455/557; 455/90.3

(58) Field of Classification Search .................... None
See application file for complete search history.

(56) References Cited

U.S. PATENT DOCUMENTS

| | | | |
|---|---|---|---|
| 2,793,355 A | 5/1957 | Randall et al. | |
| 3,416,973 A | 12/1968 | Benzinger | |
| 5,821,516 A | 10/1998 | Vandenengel | |
| 2002/0070277 A1 | 6/2002 | Hannigan | |
| 2002/0073087 A1 | 6/2002 | Bilke | |
| 2004/0125553 A1 | 7/2004 | Castell et al. | |
| 2004/0195324 A1 | 10/2004 | Uchiyama et al. | |
| 2005/0081302 A1* | 4/2005 | Elsener | 7/118 |
| 2006/0075934 A1* | 4/2006 | Ram | 108/44 |

FOREIGN PATENT DOCUMENTS

| | | |
|---|---|---|
| DE | 297 06 664 U1 | 4/1997 |
| DE | 694 14 607 T2 | 5/1999 |
| DE | 698 15 426 T2 | 1/2004 |
| EP | 1 310 858 A1 | 5/2003 |
| JP | 2005208399 A | 8/2005 |
| WO | WO 03/042902 A1 | 5/2003 |
| WO | WO 2004/059916 A2 | 7/2004 |

OTHER PUBLICATIONS

Conrad Catalogue 2004, p. 51, Figure 8 (with English translation).

* cited by examiner

*Primary Examiner* — Erika A Gary
(74) *Attorney, Agent, or Firm* — Kriegsman & Kriegsman

(57) ABSTRACT

An intermediate element for a communications system is described that has at least one communications module (131) and at least one contact mechanism (134) that is independent in form in relation to the components (12) to be contacted with the contact mechanism (134). In addition, a communications system (10) as well as a method for producing a communications link between an electronic device (11) and a support element (12) is described.

20 Claims, 2 Drawing Sheets

COMMUNICATIONS SYSTEM, INTERMEDIATE ELEMENT FOR A COMMUNICATIONS SYSTEM, AND METHOD FOR ESTABLISHING A COMMUNICATIONS LINK

BACKGROUND OF THE INVENTION

The present invention relates to a communications system, an intermediate element for a communications system, and a method for producing a communications link.

For modern communications networks, in particular, there have been efforts to minimize the size of the individual components of the network, particularly the end devices, and, at the same time, to make possible a communication that is as flexible as possible.

This results in the problem of entering data and information into an end device of a communications network. For cell phones, for example, the space for a keyboard is limited on account of the increasingly smaller size. At the same time, however, the functionality of such end devices is being increasingly enhanced. Thus, some cell phones have in the meantime come to include functions such as an address book, a pocket calculator, a calendar, e-mail functions, word processing, and the like.

In order to take these different developments into consideration, accessory parts that can be connected to the end devices of a communications network and serve, in particular, for the input of information have been developed.

In the course of this development, keyboards have been developed, for example, that can be transported separately from a cell phone and, when needed, can be connected to the latter. Such keyboards, for example, may have a folding mechanism that makes it possible to keep them small in size for transport. These keyboards are connected to the cell phone, as a rule, via a cable connection, the cable being inserted in plug sockets provided for this purpose on the keyboard and on the cell phone.

The drawback of such peripheral devices lies in the fact that, on the one hand, they are relatively expensive in terms of production costs and, on the other hand, they must be designed specially for connection with the end device; for example, they must have a specific plug socket. In this respect, the use of these peripheral devices is limited, as a rule, to a specific end device or to a specific model of an end device.

Furthermore, such peripheral devices are restricted to one type of input—for example, input via a keyboard, which is assigned thereto. If data are input via a different type of input, for example, by means of optical recording, the user must use another peripheral device, which, then, also must enable appropriate connection devices to connect with the end device.

SUMMARY OF THE INVENTION

The present invention is thus based on the problem of creating a communications system that does not have the drawbacks of the prior art, but still affords the user the possibility of being able to use an electronic device, particularly an end device, in a way that is as versatile and simple as possible.

The problem is solved in accordance with the invention by way of an intermediate element having the features according to the independent patent claim 1, a communications system having the features according to the independent claim 9, and a method having the features according to the independent patent claim 19. Further advantages, features, details, aspects, and effects of the invention ensue from the subclaims, the description, and the drawings. Features and details that are described in connection with the intermediate element of the invention obviously apply as well in connection with the communications system of the invention or in connection with the method of the invention and vice versa.

The invention is based on the realization of separating communications functions and further functionalities among different components and creating a connection possibility that is not limited to special devices.

According to a first aspect, the problem is solved by an intermediate element for a communications system that is characterized in that the intermediate element comprises at least one communications module and at least one contact mechanism that is independent in form in relation to one of the components to be contacted.

Here, communications system refers to a system in which signals, particularly data or information, can be transmitted in at least one direction between at least two components. The at least two components can be represented, for example, by an end device of a communications network and a peripheral device. In terms of the invention, communication is, in particular, data transmission or transmission of information. This may be restricted to one direction or else may occur bidirectionally between two components.

A contact mechanism that is independent in form in relation to the components to be contacted, in terms of the invention, refers to a contact mechanism that can be brought into contact with contact areas of different forms. The contact area lies on the respective component to be contacted, which may, in particular, represent a support element. In this connection, a support element is understood to be a component that supports at least one electronic element. The support element may also represent an independent electronic device. Because the contact mechanism can be brought into contact with components of different forms, the user can use the intermediate element essentially independently of the type of component or support element that is to be contacted with it. Accordingly, the same intermediate element can be used for several support elements.

For the contact mechanism in accordance with the invention, it is essential that it have a contact surface or a contact point that can be brought into physical contact with a contact area of the component to be contacted. The contact for signal transmission can be produced via the contact surface or the contact point. It is also possible for the contact to be produced via several contact surfaces on the contact mechanism. For this to occur, a form-fitting contact between the contact mechanism and the contact area or the component to be contacted is not required. A force acting between the contact mechanism and the component must only be large enough that it is adequate for a physical contact, that is a tactile connection between the contact area or the contact point of the contact mechanism and the contact area of the component, particularly the support element.

Because a communications module is further provided in the intermediate element, support elements that are to be integrated into a communications system can be furnished with a communications functionality. This also means that passive components, that is, components that originally have no communications functionality, can be constituent parts of a communications system.

In addition to producing a contact between the support element and the intermediate element, by means of which the signals can be transmitted, the contact mechanism of the intermediate element can also serve for fixing in place the intermediate element on the support element that is to be integrated into the communications system.

Because the communications functionality is integrated in the intermediate element and the latter can be contacted with a support element, the support element can be designed in a simple manner.

According to one embodiment, the intermediate element is designed in such a way that the communications module comprises a transmitting unit. In this way, the intermediate element can serve to send or to transmit information from a support element to a further constituent part of the communications system, in particular to an end device.

Alternatively or additionally, it is possible to design the communications module in such a way that it comprises a receiving unit. In this way, signals and particularly information can be received at the intermediate element and, if need be, relayed to the support element. Such signals and information may represent, for example, authentication requests or other acknowledgement signals from an end device.

Preferably, the intermediate element comprises a power supply unit. This power supply unit can preferably be operated independently of a power network and can take the form, for example, of a battery or a rechargeable battery. The power supply unit serves, in particular, for operating the intermediate element, particularly the communications module. In this embodiment, however, flexibility is further enhanced with respect to the support element that can be connected to the intermediate element. Namely, it is also possible to incorporate into the communications system support elements that have no power supply or only a power supply of low power. The power supply of the intermediate element can be designed for the operation of the functionality provided for in the support element. If the support element has no power supply, then the power supply unit of the intermediate element supplies the voltage required for the operation of the support element.

Preferably, the communications module is designed for wireless communication with at least one component of the communications system, particularly with an electronic device, such as, for example, an end device. Since the communication between the intermediate element and the end device is produced via an air interface, the handling of the intermediate element is further simplified. However, in the framework of the invention, the communication connection between the intermediate element and the additional components, in particular the end device, may also be established by means of a cable connection.

In accordance with the invention, the contact mechanism may represent a clamping mechanism. This type of fastener has a number of advantages. On the one hand, in a clamping mechanism, the form of the support element can be chosen essentially at will. In particular, it is not necessary to provide a point of connection, such as, for example, a plug, that is designed especially for this purpose. Furthermore, a clamping connection enables a secure contact to be established between the electronic component of the support element and the intermediate element. Finally, an appropriate choice of the clamping surface also allows an additional advantage to be achieved. If the clamping surface is provided with projections, for example, they can serve to expose a contact that is covered with a protective layer on the support element and thus to bring the electronic component, for example, the circuit of the support element into contact with the intermediate element.

In accordance with the invention, furthermore, a processing unit may be provided in the intermediate element for signal processing. This processing unit is preferably designed for the processing of signals that were received or transmitted from the communications module. The processing unit may, in particular, represent an authentication unit, which is designed for checking the authenticity of the connection made between the intermediate element and at least one component of the communications system. Alternatively, in the processing unit, it is also possible to process information concerning the support element that is connected to the intermediate element. Thus, for example, an inquiry that checks the device characteristics of the end device can be carried out. In addition, the authentication unit can also serve for checking content. In this manner, it is possible to prevent misuse. In accordance with the invention, it is also possible to integrate at least a part of the processing unit into the end device and/or the support element instead of into the intermediate element.

The intermediate element in accordance with the invention is preferably designed for communication via an air interface by means of electromagnetic waves as a transmission medium, it being possible for the communication to be produced according to different protocols and standards. Thus, it is possible to design the intermediate element in such a way that it can communicate via the Bluetooth protocol with other Bluetooth-enabled components of the communications system. To this end, a high-frequency part and a baseband controller can be provided in the intermediate element, for example. Also possible is a communication via the so-called ZigBee protocol according to Standard IEEE 802.15.4. The invention is not limited to these types of communication. Thus, apart from communication by means of radio frequency waves, it is equally possible to use infrared waves as a communication medium for the air interface.

According to a further aspect, the problem is solved by a communications system that has at least one electronic device. The communications system is characterized in that it comprises at least one support element, which supports at least one electronic component, and at least one intermediate element, whereby the intermediate element is designed for communication with at least one electronic device and can be detachably connected to the at least one support element.

In terms of the invention, electronic devices may be all devices that are furnished with a communications capacity. This communications capacity can be integrated in the electronic device or it may be provided through an adaptor or other auxiliary mechanisms. Such electronic devices can represent, for example, control devices that control fixtures such as illumination. Preferably, however, the electric device represents an end device of a communications network. Referred to as an end device in terms of this invention is a user-side device of a communications network. The communications network may be, for example, a cellular network, the Internet, or an intranet. For the present invention, however, it is not absolutely essential that the end device be linked to the communications network. The end device may be, for example, a personal computer (PC), a laptop, a PDA, or a cell phone.

Referred to as a support element is a component that can interact with the end device. In particular, the support element may comprise a memory storage unit. This memory storage unit can interact with the end device in that it takes in information from the end device or in that it reads out information from the end device.

Preferably, the support element has a logic block. The latter can serve, for example, for transforming actions on the support element into signals. In this embodiment, the support element can represent, for example, an input mechanism, such as a keyboard. In this embodiment, the logic block is, for example, a circuit that has at least one and preferably at least two areas that produce different signals on physical contact.

However, the logic block can also serve for transformation of signals that were received via the intermediate element. In this case, it is possible, depending on a received signal, to actuate an output unit, for example, by means of which, for example, optical signals can be emitted. Furthermore, the logic block can comprise programs that may represent games, for example.

According to one embodiment, the support element represents a support made of paper, paperboard, or any other flexible material. Referred to as flexible material is particularly material that has a low stiffness. In this way, the support element can be rolled up or folded to a small size. In addition, the production costs for such a support element are low.

The form of the support element, for example, can be a plate or, when paper or paperboard is used, a sheet, or a card. This flat form of the support element has the advantage that the intermediate element can easily be brought into contact with the support element.

Especially preferred is to form the at least one electronic component from a polymeric material. It is further preferred for the support element to comprise a plurality of electronic components, which constitute a circuit. In fact, the scope of the invention also includes the creation of the circuit from conventional circuit components, such as wires. The use of a polymer offers the advantage, however, that the circuit can be created in a simple and low-cost way. In addition, the flexibility, that is, the form-changing capacity of a polymeric circuit, is greater than that of a circuit made of metal constituent parts. In this way, for example, the form of the support material can also be changed with a flexible support material, such as paper, and it is possible to prevent the circuit from detaching from the support material.

According to one embodiment, the communication that can be reduced via the intermediate element is the transmission of data from the support element to the electronic device of the communications system.

For the creation of the contact between the intermediate element and the support element, particularly the circuit of the support element, it is possible to use a force that is applied by the intermediate element. This force can be a clamping force. The clamping force can be produced by using a clamp, which can be operated, for example, via two levers that can be pressed together in order to release the clamping force.

However, it is also possible to use the weight of the intermediate element to produce the contact. In this case, the intermediate element is simply laid on the support element of the communications system. Other types of fastening, such as, for example, magnetism or other mechanical connections, are also possible.

The support element preferably has a contact area in which at least a part of the electronic components of the support element can be brought into contact with the intermediate element. At least part of the electronic components, particularly the circuit, is exposed in the contact area. For a support element having a flat structure, this contact area is located preferably in the edge region of the support element. In this case, the contact area can extend over the entire edge region. However, it is also possible to limit the contact area to a defined site along the edge. In this case, the contact area can be indicated by a marking on the support element. The advantage of using the intermediate element of the invention for producing the contact lies in the fact that the contact area on the support element does not need to extend all the way to the edge of the support element. Instead, the contact area, which, as a rule, represents the end of a circuit, can be provided at a distance from the edge of the support element. If, for example, a clamp is used as intermediate element, then it can have clamping arms, which enable the contact area to be reached from the edge.

The detachable contact between the intermediate element and the support element can be established by way of a force that is applied by the intermediate element. Alternatively, it is possible, for example, to use a force that is produced jointly by the intermediate element and the support element. This force can be, for example, the attractive force of a magnet, which can be provided in the support element or the intermediate element and which interacts with a magnetic material of the other element.

The communications system preferably comprises an intermediate element in accordance with the invention.

According to another aspect, the problem is solved by a method for producing a communications link in a communications system between an electronic device and a support element that supports at least one electronic component. The method is characterized in that the communication is initiated via an intermediate element, which is detachably connected to the support element.

The method in accordance with the invention is preferably carried out in a communications system in accordance with the invention.

BRIEF DESCRIPTION OF THE DRAWINGS

The invention will now be described in detail on the basis of embodiment examples with reference to the attached drawings. Shown are.

DETAILED DESCRIPTION OF THE INVENTION

Figure 1:
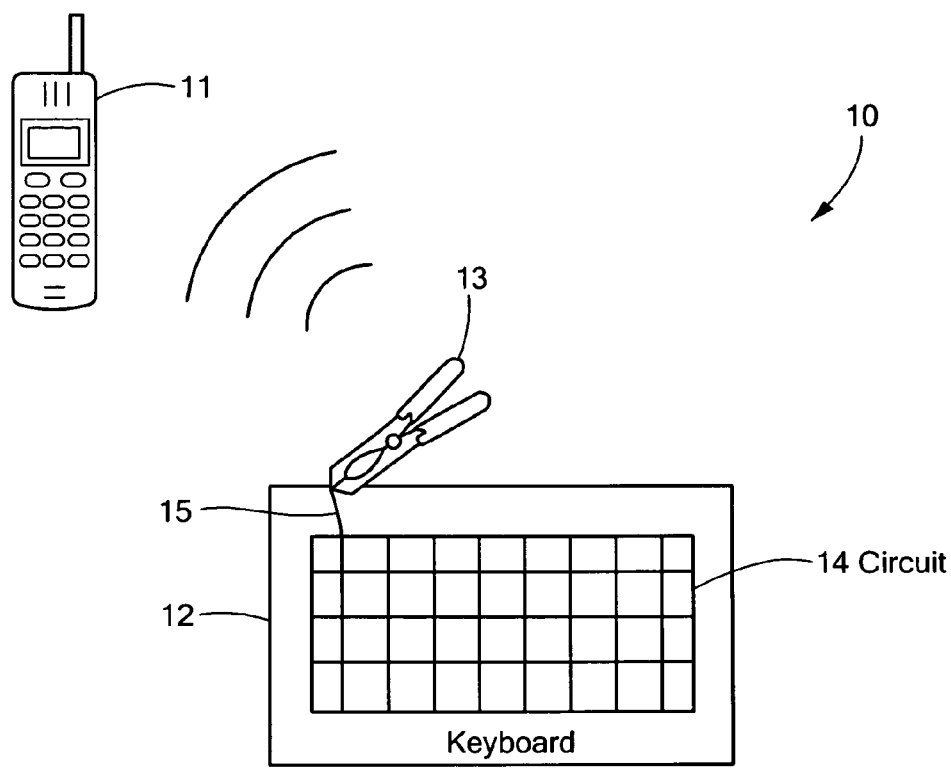
FIG. 1 in schematic view, one embodiment of the communications system in accordance with the invention.

Depicted in FIG. 1 is a communications system 10, which has an end device 11 in the form of a cell phone. Furthermore, the system comprises a support element 12. In the depicted embodiment, this support element 12 is a keyboard. The keyboard consists of a support, which can consist, for example, of paperboard or paper. Placed on this support is a circuit 14. In the depicted embodiment, the circuit 14 consists of a polymeric material and is pressed onto the support. Detachably fastened to the support element 12 is an intermediate element 13. In the depicted embodiment, the intermediate element 13 takes the form of a clamp, which represents a contact mechanism 134 in the form of a gap formed between clamp arms. The clamp is designed in such a way that, on at least one clamping surface, it consists of material that allows the electronic contact between the circuit 14 of the keyboard and the electronics of the intermediate element 13. The contact is produced in a contact area 15 of the support element 12. Provided in the intermediate element 13 is a communications module 131. This communications module 131 is designed in such a way that it can at least transmit signals to the cell phone 11.

If, in this state, the keyboard is operated by the user 20, the signals produced in the circuit 14 by this operation are transmitted via the intermediate element 13 to the cell phone 11 and can be processed therein.

Because the support element 12 consists of a versatilely useable material, it may be integrated into other products, for example. Thus, the support element may be integrated, for example, as an advertising article in product packagings and be separated out of the product packaging for use.

Figure 2:
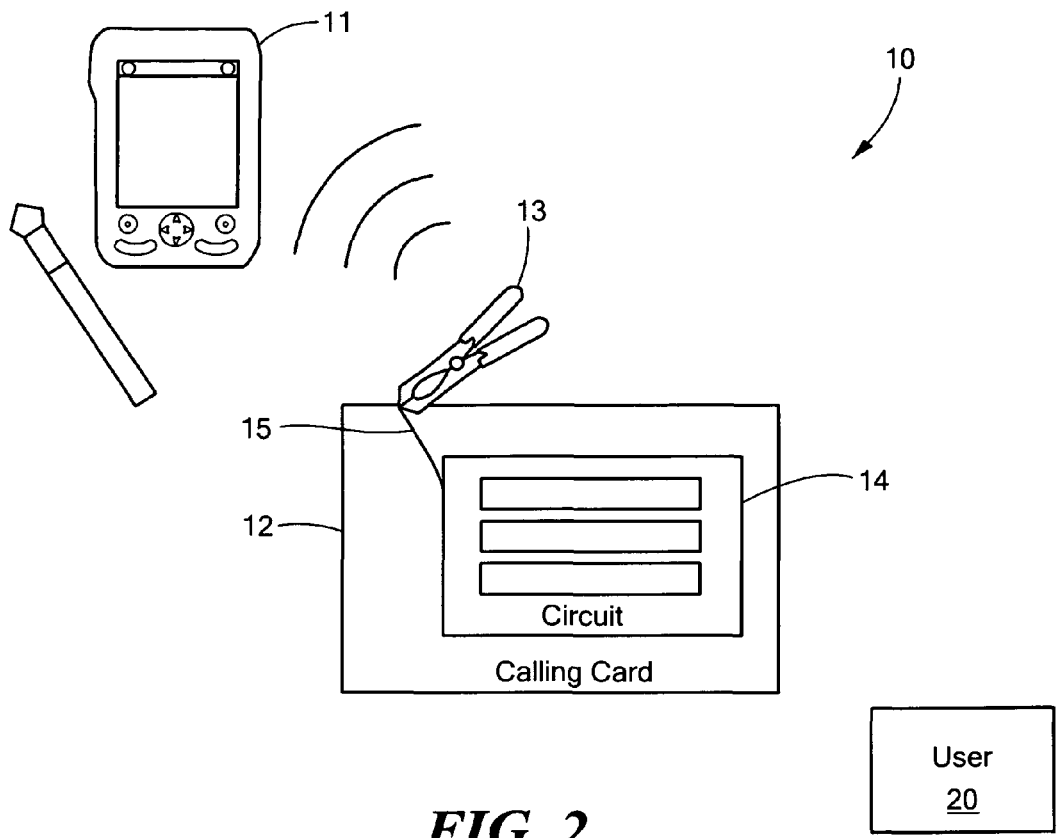
FIG. 2 in schematic view, another embodiment of the communications system in accordance with the invention.

Shown in FIG. 2 is another embodiment of the communications system 10. In this embodiment, the support element 12 represents a calling card. The calling card is provided with a circuit 14, which comprises at least one memory storage unit. Stored in digital form in the memory storage unit is the information concerning the owner of the calling card.

Figure 3:
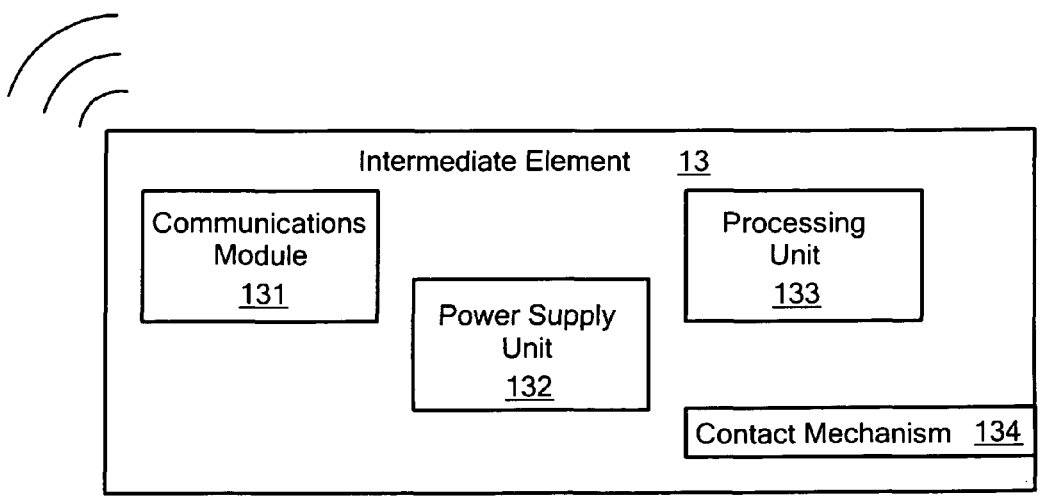
FIG. 3 in schematic view, an embodiment of the intermediate element in accordance with the invention.

If an intermediate element 13 in accordance with the present invention is fastened—for example, clamped—to this calling card, the passive calling card becomes an active input mechanism. In particular, via the communications module 131, the stored information can be transmitted to an end device 11, which is shown as a PDA in FIG. 2, and stored therein. Accordingly, the intermediate element 13 allows a simple transmission of data, it being possible to dispense with separate reading mechanisms. In the embodiment shown in FIG. 3, the intermediate element 13 has a power supply unit 132.

Alternatively to the embodiment of transmitting personal information from a calling card to a PDA, described in reference to FIG. 2, a calling card can also be provided with another circuit 14. The latter can be designed in such a way that, when the telephone number or another defined area is touched, a connection is produced via the intermediate element 13 to a cell phone 11 and, from it, a call is initiated to the telephone number.

The method in accordance with the invention can take place as follows, for example for the embodiment shown in FIG. 1. The user 20 obtains the keyboard, for example, by cutting it out of a newspaper, a magazine, or a package. Subsequently, the user 20 fastens the intermediate element 13 to the keyboard. To this end, optionally, he can orient himself or herself to a marking provided on the keyboard. After attachment of the intermediate element 13, the latter produces the contact to devices that lie within its range—for example, lying in a surrounding area of 10 m to 100 m. This takes place, as a rule, by sending out signals from the intermediate element 13 and receiving an authentication from a device in the surroundings. If one of the devices in the surroundings is designed for receiving information from the intermediate element 13—for example, it is Bluetooth-enabled—an authentication request can be started in the end device 11 in order to determine whether the intermediate element 13 is authenticated to communicate with the end device 11. This authentication can be dispensed with, for example, if the user 20 of the intermediate element 13 reports it to the end device(s) 11 prior to the first operation of the intermediate element 13. If the authentication is given, it is possible to carry out, in addition, a checking step, which concerns the information that is to be sent from the support element 12 to the end device 11. Here, for example, the device characteristics of the end device 11 can be compared with the requirements of the information stored on the support element 12. If it turns out, for example, that a game is stored on the support element 12 and requires a message that is not supported by the end device 11, the connection can be broken and a corresponding error message is issued.

The same holds true for the transmission of information. In this case, a security operation is also carried out prior to the actual creation of the link, whereby, for example, a processing unit 133, in particular a logic unit, can be integrated into the intermediate element 13, this logic unit having a filter that prevents the downloading of damaging data onto an end device 11.

In addition or alternatively, a checking can be performed to determine whether there are fees for the transmission of data.

The invention is not limited to the depicted embodiments.

In the present invention, the intermediate element can also be designed in such a way that it can enter into communication with several end devices of a communications system. In this way, it is possible, for example, for the input of an address in a cell phone to occur simultaneously with the input in a laptop, as long as these two devices are designed for communication with the intermediate element.

It also lies within the scope of the invention to establish communication between the intermediate element and the end device alternatively via a different type of transmission than the described Bluetooth link. Thus, for example, a communication via the so-called ZigBee protocol can be used. Also possible is a transmission of information between the intermediate element and the end device via a cable connection.

The type of connection is chosen, as a rule, according to the use requirements.

The support element may also have a different design than that depicted. Thus, it is possible to provide, for example, games or other programs on the support element, which, when the intermediate element is connected to the support element, can be played or run by interaction with the end device.

In accordance with the invention, the support element can also represent an invitation. For this, it is possible, in addition to the written text of the invitation, also to save route directions or a map section digitally in the support element; after fastening the intermediate element, this information can then be transmitted, for example, to a navigation system in a motor vehicle.

The advantage of the intermediate element in accordance with the invention lies particularly in the fact that it may be used in a versatile manner. Because the communications module required for transmission of information is provided in the intermediate element, the latter can be used with any support elements. Therefore, the user is able temporarily to integrate different support elements in the communications system by using a single intermediate element.

With an appropriate choice of the contact mechanism, the flexibility is enhanced still further. For example, if a clamp is used, then the form of the support element can be chosen essentially at will. As a rule, the circuit is made readily accessible in the edge region of the support element. However, this is not absolutely essential, because the clamp can also engage the circuit through a protective layer, for example.

In addition to the above-described alternatives, the contact mechanism can represent a tab, for example, which can be inserted into an opening provided for this purpose in the support element. In this design of the support element, the opening serves simultaneously as a positioning marker.

However, such a positioning marker can also be afforded by the circuit itself if the latter consists of a material that can be recognized on the support material. Alternatively or in addition, the positioning marker can be printed, particularly for a support made of paper, paperboard, or plastic or any other printable material.

Accordingly, the present invention creates the possibility of connecting peripheral devices to electronic devices, particularly cell phones or other communications end devices, in a simple way. Furthermore, the invention affords the possibility of incorporating information carriers that represent passive components in a communications system into the communication.

LIST OF REFERENCE NUMBERS 10 communications system
11 end device 12 support element
13 intermediate element
131 receiving and transmitting unit
132 power supply unit
133 processing unit
134 contact mechanism
14 electronic component/circuit
15 contact area
20 user

The invention claimed is:

1. An intermediate element for a communications system, characterized in that the intermediate element has at least one communications module and at least one contact mechanism that is independent in form in relation to the components to be contacted with the contact mechanism, wherein said contact mechanism can be brought into contact with contact areas of different forms.

2. The intermediate element according to claim 1, further characterized in that the communications module comprises a transmitting unit.

3. The intermediate element according to claim 1, further characterized in that it comprises a power supply unit.

4. The intermediate element according to claim 1, further characterized in that the communications module is designed for a wireless communication with at least one component of the communications system, particularly with an end device of the communications system.

5. The intermediate element according to claim 1, further characterized in that the contact mechanism represents a clamping mechanism.

6. The intermediate element according to claim 1, further characterized in that it comprises a processing unit for signal processing.

7. The intermediate element according to claim 6, further characterized in that the processing unit represents an authentication unit and serves for checking the authentication of the connection produced between the intermediate element and at least one component of the communications system.

8. The intermediate element according to claim 1, further characterized in that it is designed for communication via electromagnetic waves, in particular according to the Bluetooth protocol or a protocol based on the IEEE 802.15.4 Standard.

9. A communications system having at least one electronic device, characterized in that the communications system comprises at least one support element, which supports at least one electronic component, and at least one intermediate element, whereby the intermediate element is designed for communication with the at least one electronic device and can be detachably connected to the at least one support element, wherein said intermediate element comprises a contact mechanism that is independent in form in relation to the components to be contacted with the contact mechanism, wherein said contact mechanism can be brought into contact with contact areas of different forms.

10. The communications system according to claim 9, further characterized in that the support element represents an information carrier.

11. The communications system according to claim 9, further characterized in that the support element has at least one memory storage unit.

12. The communications system according to claim 9, further characterized in that the support element has at least one logic block.

13. The communications system according to claim 9, further characterized in that the support element represents a peripheral device, particularly an input mechanism, for the electronic device of the communications system.

14. The communications system according to claim 9, further characterized in that the support element consists of a flexible material, in particular of cardboard or paper.

15. The communications system according to claim 9, further characterized in that the support element has a contact area, in which at least part of the electronic components of the support element can be brought into contact with the intermediate element.

16. The communications system according to claim 9, further characterized in that the detachable contact between the intermediate element and the support element is produced by a force that is applied by the intermediate element.

17. The communications system according to claim 9, further characterized in that the electronic device is a mobile end device, in particular a cell phone, a laptop, or a personal digital assistant (PDA).

18. The communications system according to claim 9, further characterized in that it has an intermediate element, the intermediate element having at least one communications module and at least one contact mechanism that is independent in form in relation to the components to be contacted with the contact mechanism.

19. A method for producing a communications link in a communications system between an electronic device and a support element that supports at least one electronic component, characterized in that the communication is initiated via an intermediate element, which is detachably connected to the support element, wherein said intermediate element comprises a contact mechanism that is independent in form in relation to the components to be contacted with the contact mechanism, wherein said contact mechanism can be brought into contact with contact areas of different forms.

20. The method according to claim 19, further characterized in that it is carried out in a communications system, the communications system having at least one electronic device, wherein the communications system comprises at least one support element which supports at least one electronic component and at least one intermediate element, whereby the intermediate element is designed for communication with the at least one electronic device and can be detachably connected to the at least one support element.

* * * * *